Feb. 17, 1959
P. H. GREENLEE
2,874,269
AIRCRAFT INSTRUMENT PANEL ILLUMINATOR
Filed Oct. 3, 1955
3 Sheets-Sheet 1
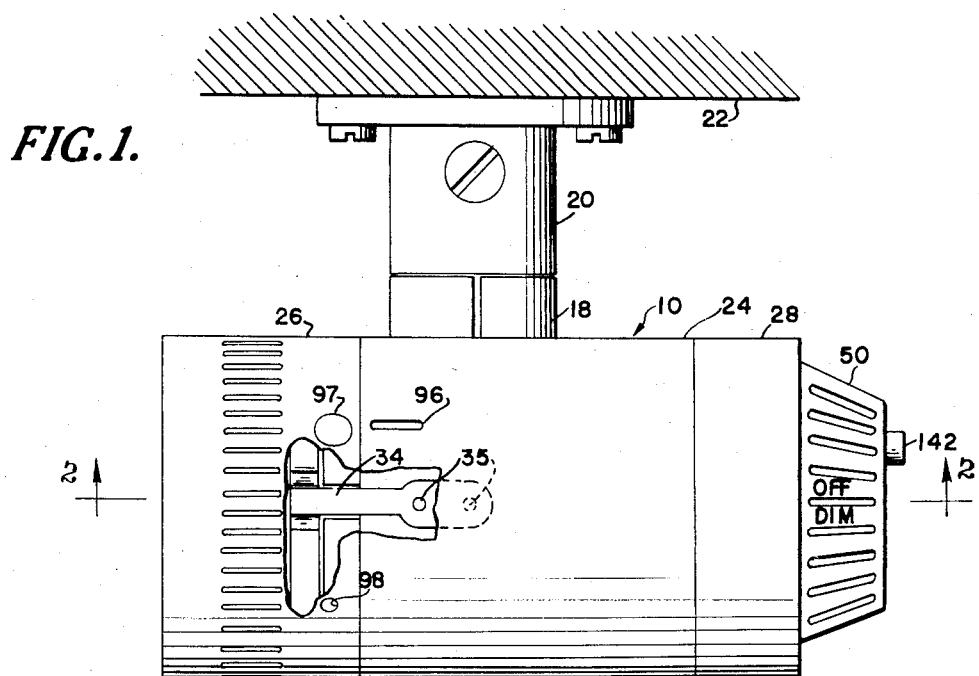
FIG.1.
FIG.2.
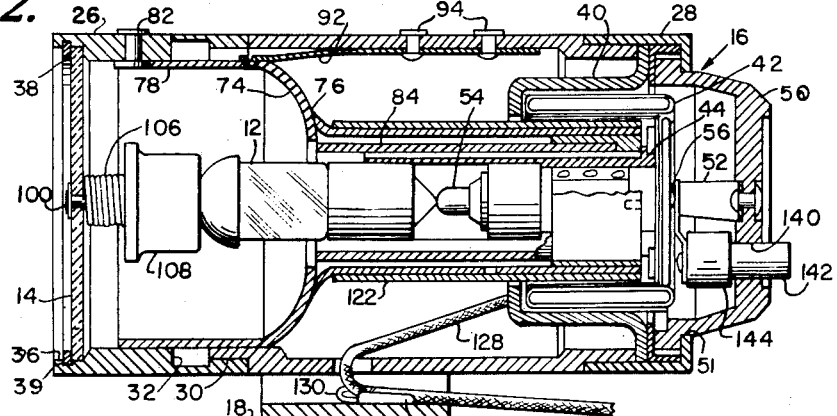
FIG.11.
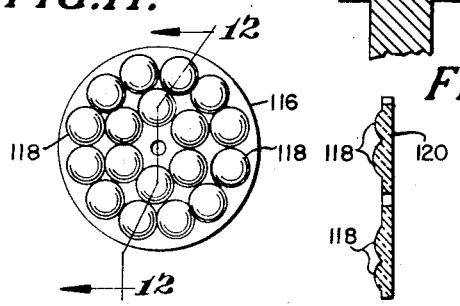
FIG.12.
INVENTOR
PAUL H. GREENLEE
BY Cushman Darby & Cushman
ATTORNEYS Feb. 17, 1959 P. H. GREENLEE 2,874,269
AIRCRAFT INSTRUMENT PANEL ILLUMINATOR
Filed Oct. 3, 1955 3 Sheets-Sheet 2
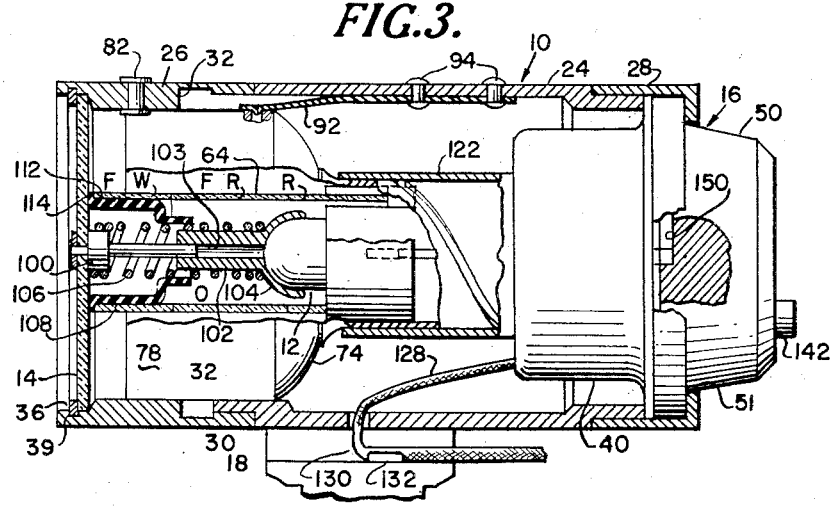
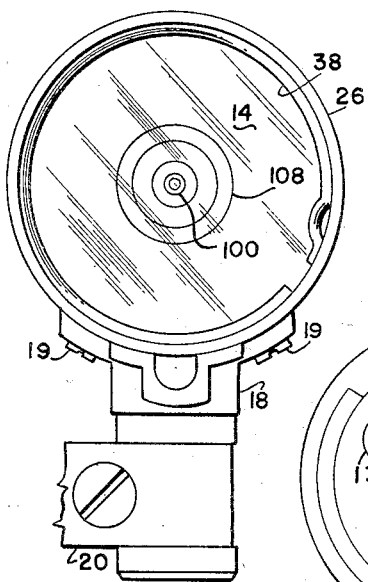
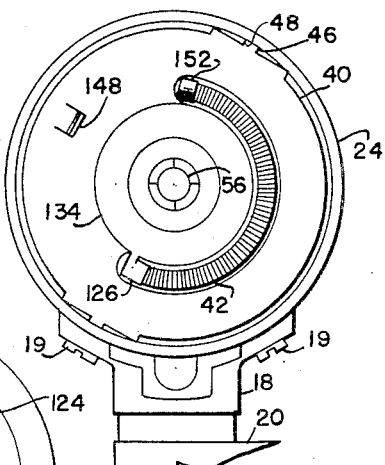
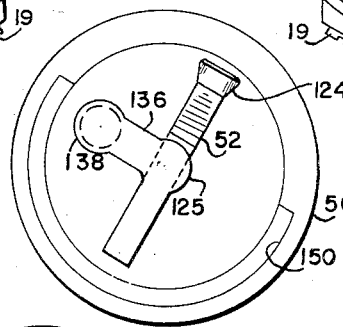
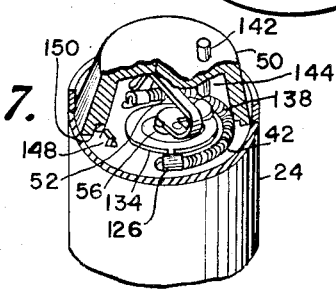
INVENTOR
PAUL H. GREENLEE
BY Cushman Darby & Cushman
ATTORNEYS

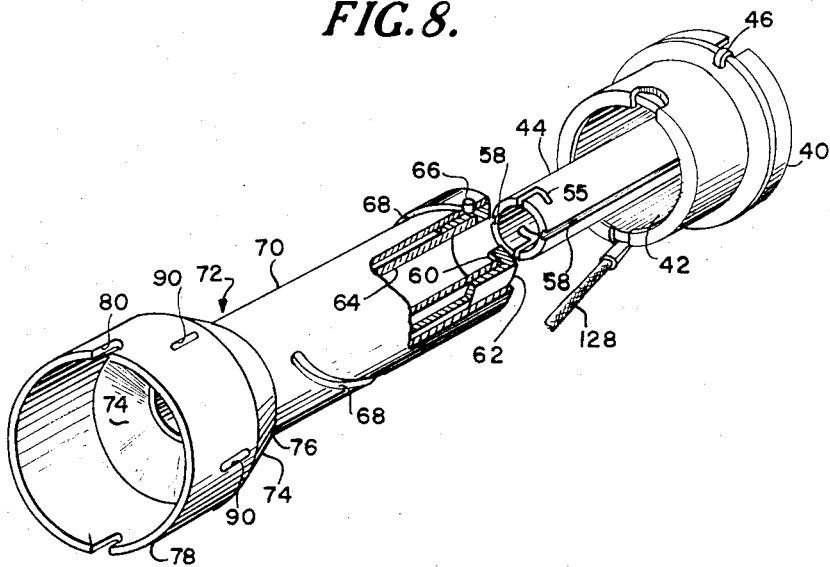
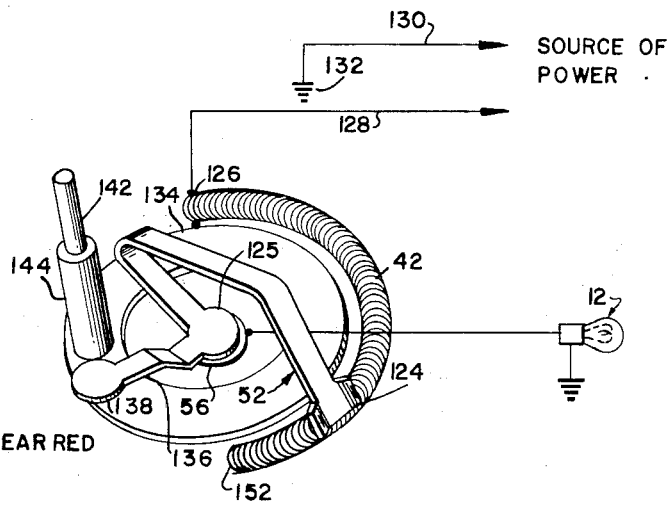
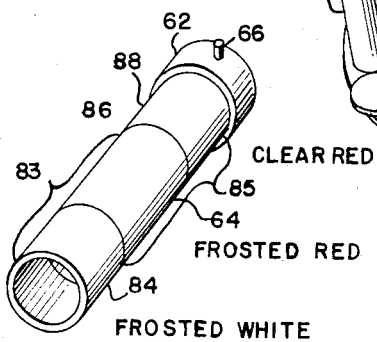

United States Patent Office 2,874,269
Patented Feb. 17, 1959

2,874,269

AIRCRAFT INSTRUMENT PANEL ILLUMINATOR

Paul H. Greenlee, Urbana, Ohio, assignor to Grimes Manufacturing Company, Urbana, Ohio, a corporation of Ohio Application October 3, 1955, Serial No. 538,021

10 Claims. (Cl. 240—8.16)

The present invention relates to a light assembly, and, more particularly, to a light assembly used in aircraft for illuminating an instrument panel, a particular instrument of the instrument panel, or the like.

Heretofore, hand portable light assemblies have been provided in cockpits of aircraft for illuminating individual instruments or the entire instrument panel as desired by the pilot. In other words, the light assemblies are provided with a spotlight which the pilot may direct on an individual instrument or on any portion of the aircraft which inspection is desired, and a floodlight for lighting the entire instrument panel, the cockpit, or the like. Light assemblies of this character are usually portable and are detachably mounted on a suitable support bracket at a convenient spot in the cockpit. When the pilot uses the light assembly, he may direct it from its mounting or remove it from the same and flash it on a desired object.

In present day military and commercial aircraft it is often desirable to have both a white and a colored light to flash on the instrument panel. In night flying a soft red light is desirable when the light assembly is utilized for illuminating the instrument panel as it does not blind the pilot when he takes his eyes off of the instrument panel to look out of the windshield or on other controls of the aircraft. Further, red light is not as visible in military aircraft by enemy aircraft. A white light is often handy around the cockpit where it is desired to fully illuminate some particular instrument or part of the cockpit. In the past separate lights were provided in the aircraft for emitting various types of light.

An object of the present invention is the provision of a small, portable cockpit lamp assembly which selectively provides a white spotlight, a white floodlight, and a red spotlight.

Another object of the present invention is to provide a cockpit utility light whereby selective converging and diffusing of the light rays may be simply and easily made by the pilot as required during flight.

Still another object of the present invention is the provision of a light assembly having means to vary the intensity of the light rays emitted therefrom, the assembly also being provided with means to instantaneously apply full intensity of light to the subject.

Ancillary to the aforementioned object, another object of the present invention is to provide a light assembly having a rheostat for controlling the intensity of light emitted from the assembly, and means associated with the rheostat for shunting the rheostat and applying full intensity to the light assembly.

Still another object of the present invention is to provide a light assembly with means for selectively filtering light emitted from its lamp, the lamp being positively maintained in a fixed centered position with respect to the filtering means and to the reflector of the light assembly.

A still further object of the present invention is the provision of a light assembly having an adjustable filter element for selectively providing a plurality of spotlights and floodlights, the light assembly being provided with a light seal to prevent leakage of light through various portions of the filter element in certain adjusted positions.

Still another object of the present invention is the provision of a light assembly having a rheostat control unit associated therewith for varying the intensity of its illumination and means for obtaining momentary full current value, the means for obtaining momentary full current value being associated with and carried by the rheostat control unit. By having the control for the shunt means positioned on the control for the rheostat, the pilot, in a dark cockpit, can instantaneously obtain full illumination without having to feel around the light assembly for a separate switch.

Another object of the present invention is to provide a cockpit light assembly having a lens which will eliminate or smooth out bright spots in the spotlight beam caused by reflection of the lamp filament in the reflector of the light assembly.

These and other objects of the present invention will appear more fully in the following specification, claims and drawings, wherein:

Figure 1 is a plan elevational view with parts cut away of the cockpit light assembly;

Figure 2 is a vertical cross-sectional view taken on the line 2—2 of Figure 1;

Figure 3 is a view similar to Figure 2 but being partly in elevation and showing the filter element of the light assembly in a position for emitting a red spotlight;

Figure 4 is a front elevational view of the light assembly;

Figure 5 is a rear elevational view of the light assembly with the rheostat operating knob omitted;

Figure 6 is an end elevational view of the rheostat knob looking into the rheostat wiper arm;

Figure 7 is a fragmentary perspective, partly in cross-section of the rheostat unit and shunt device;

Figure 8 is a detailed perspective exploded view of the reflector, filter assembly, and lamp support;

Figure 9 is a diagrammatic wiring diagram of the electrical circuits of the lamp assembly;

Figure 10 is a detailed perspective view of the filter element;

Figure 11 is a detailed elevational view of a modified lens for the lamp assembly of the present invention; and Figure 12 is a view taken on the line 12—12 of Figure 11.

Referring specifically to the drawings wherein like character or reference numerals represent like or similar parts, the cockpit utility light assembly of the present invention includes a tubular housing or casing generally indicated by the numeral 10 which supports and houses a lamp 12. One end of the housing 10 is enclosed by a lens 14 while the other end supports and is enclosed by a rheostat unit generally indicated by the numeral 16. Housing 10 is fixedly secured to a pivotable post assembly 18 which is adapted to be detachably received in a bracket 20. Bracket 20 is conveniently positioned on a wall 22 of the cockpit of an airplane whereby the light assembly may be pivoted to a desired position to flash light upon the instrument panel of the aircraft. On the other hand, if the pilot desires to flash the light assembly on some other object within or without the aircraft, housing assembly 10 and its post assembly 18 may be removed from bracket 20 and held in any convenient position.

As previously pointed out in the objects of the specification, the light assembly of the present invention is so constructed that it will selectively transmit the white beam or spot of light, a white floodlight, a red floodlight, or a red beam or spot of light. Further, the intensity of lamp 12 can be varied as the situation may require or full current may be instantaneously applied to the lamp to give full intensity without changing the setting of the rheostat unit 16. The structural elements which produce the aforementioned results will be hereinafter described in full.

Housing 10 includes a center tubular section 24 on which the post assembly 18 is fixedly attached by any suitable means such as the machine screws 19, a rotatable barrel 26 which supports lens 14, and a retainer cap 28 for retaining the rheostat unit 16. Barrel 26 is adapted to telescope on to an undercut portion 30 provided on the end of tubular section 24. An annular groove 32 is provided on the inner wall of barrel 26 and is adapted to receive a spring clip retainer 34 (Figure 1), which is rigidly connected to the inner wall of center tubular section 24 by suitable rivets 35 or the like. Spring clip retainer 34 permits rotation of barrel 26 with respect to center section 24 but prevents longitudinal movement of the barrel with respect to the center section unless the spring clips are forced out of the groove 32 so that the barrel can be removed from the center section.

The inner wall of barrel 26 adjacent its forward end is provided with an undercut portion indicated at 36 for receiving lens 14. A suitable snap ring 38 adapted to fit in an annular groove 39 in the undercut portion 36 retains lens 14 in the end of barrel or sleeve 26.

Referring now to Figures 2 and 3, retainer cap 28, which is adapted to fixedly retain the rheostat unit or assembly 16 in place on the rear end of housing 10, is held on to the center section 24 by any suitable means such as machine screws or the like. Rheostat unit 16 includes a rheostat housing 40, a resistance coil 42 carried by housing 40 and a socket 44 for lamp 12 carried centrally of the housing and coil. Rheostat housing 40, which is cup-shaped, is provided on its periphery with lugs 46 (Figure 8), which are adapted to fit into slots 48 (Figure 5) on the end of center section 24. Lugs 46 will properly position the rheostat with respect to the center section 24 of housing 10 and will prevent rotational movement of the rheostat housing 40.

It will be noted that the rheostat unit 16 is provided with a current control knob 50, which extends through an aperture or hole 51 in retainer cap 26 and is held in place against the rheostat housing 40 thereby. Knob 50 is rotatable with respect to rheostat housing 40 and carries with it a wiper arm 52 which contacts the resistance coil 42 to vary the intensity of current supplied to lamp 12. A more detailed description of wiper arm 52 and its function will follow later in the specification.

Lamp socket 44 is provided with a spring pressed contact 54 which contacts the contact on the base of the lamp. Lamp 12 is provided with radially extending lugs (not shown) which are received in bayonet connection slots 55 (Figure 8) in socket 44 and is thus retained therein. Contact 54 is connected by a suitable conductor not shown to a binding post 56 of rheostat unit 16.

As clearly shown in Figure 8, socket assembly 44 for lamp 12 is provided on its outer surface with longitudinal grooves 58 which are adapted to receive internal lugs 60 provided on inner wall of a filter holder 62. Filter holder 62 support is adapted to receive and support an elongated tubular filter 64. Details of filter 64 which is cemented to inner wall of holder 62, will be described later in the specification. The outer surface or wall of filter holder 62 is provided with a radially extending pin 66 which fits in a helical trackway 68 on a tubular portion 70 of a reflector assembly 72. The reflector assembly 72 is provided with a concave reflector 74 to which the tubular portion 70 is rigidly connected by soldering or the like at 76 and a sleeve portion 78 extending longitudinally from the outer periphery of reflector 74. The sleeve portion 78 is provided on its forward edge with longitudinally extending notches 80 which are adapted to be received in lugs 82 carried by barrel 26.

From the above description it is evident that when the lamp assembly is assembled, rheostat housing 40 is fixed with respect to the center portion 24 of casing 10. However, since reflector assembly 72 is keyed to the rotatable barrel 26 by means of the lugs 82 engaging slots 80 in the reflector assembly, the reflector assembly will rotate when barrel 26 is rotated. Since helical trackway 68 is on tubular portion 70 of reflector assembly 72, pin 66 on filter holder 62, which travels in the trackway, will slide longitudinally of casing 10 when barrel 26 is rotated. In other words, filter holder 62, being keyed to lamp socket 44, which is stationary with respect to section 24, moves longitudinally in the keyway or groove 58 when barrel 26 is rotated. Depending on the direction of rotation of barrel 26, filter element 64 moves forwardly or rearwardly about lamp 12. However, rotation of barrel 26 and reflector 74 does not cause movement of the reflector with respect to the filament of lamp 12.

Filter element 64 is preferably made of glass or the like and, as shown in Figure 10, is provided with a longitudinal portion 83, which is ground on the outside thereof. A portion 84 of the filter is made of clear glass, while the remaining portion 85 of the filter is made of red glass. The portion 84 having clear glass ground on its outer side will be frosted white, whereas the intermediate portion 86, made of red glass and ground on its outer side, will be frosted red. The remaining portion 88 of the filter will be transparent red. When filter element 84 is in the fully retracted position as shown in Figure 2, light rays from the filament of lamp 12 is transmitted by reflector 74 in a white beam or spot. As filter element 84 is moved forwardly toward lens 14, frosted white portion 84 will completely surround lamp 12 and at this time the light ray from the filament of lamp 12 is diffused and reflector 74 transmits a white flood light. Further movement of filter element 64 toward lens 14 brings the frosted red portion of the filter element to a position surrounding lamp 12, and when in this position the light rays from lamp 12 are diffused and red so as to give a red floodlight. As shown in Figure 3, the filter element is fully extended and in this position the clear red portion of the filter element is adjacent lamp 12 and, consequently, since there is no diffusing of the light rays from the filament of lamp 12, reflector 74 transmits a red beam or spot.

As shown in Figure 8, sleeve portion 78 of reflector assembly 72 is provided with a plurality of apertures 90, spaced circumferentially thereon. A spring urged detent 92 fixedly attached to section 24 by rivets 94 provides easy indexing of barrel 26 with respect to section 24 in order that the operator may properly locate the filter element with respect to the lamp to obtain a desired beam of light. Suitable indicia, such as a line 96 and dots 97 and 98 are provided respectively on the outside wall of section 24 and barrel 26 to show the type and color of beam being transmitted by the lamp assembly. In other words, small dot 98, when aligned with index marking 96, indicates a spotlight is being transmitted, while large dot 97, when aligned with index marking 96 indicates that the lamp assembly is transmitting a floodlight. Since the lamp assembly transmits both red and white spotlights and floodlights, spots 97 and 98, only two of which are shown in Figure 1, may be suitably colored to indicate the particular color and beam of light being transmitted.

It is very important that the filament of lamp 12 remain on the principal axis of reflector 74 throughout movement of the filter to the various positions mentioned above. In other words, if the filament of lamp 12 was to get off of the principal axis of the reflector during rotation of barrel 26 to change the position of filter element 84, then an irregular beam of light would be transferred. To maintain lamp 12 centered with respect to the reflector so that its filament remains on the principal axis of the reflector, a post element 100 is provided and is rigidly attached in the center of lens 14. Post element 100 extends rearwardly from lens 14 toward, but terminating short of, lamp 12. A sleeve element 102 having a bore 103 therethrough is adapted to slide longitudinally on post element 100. The end of sleeve element 102 adjacent lamp 12 is cup-shaped, as indicated at 104 so as to receive the end portion of lamp 12. A spring 106 encircling post element 100 and sleeve element 102 and bearing against lens 14 and cup-shaped portion 104 of sleeve element 102 resiliently urges the sleeve element into constant pressure engagement with lamp 12 to thereby center the lamp with respect to reflector 74. Further, it will be noted, cup-shaped portion 104 of sleeve 102 completely encircles the end of lamp 12 so that it will shield any light rays from passing directly forward from the lamp through lens 14. This prevents a bright spot in the center of either the white or red floodlight and it also prevents a white spot in the center of the red spotlight, as all light rays from the lamp must be reflected forward by the reflector.

A rubber boot element 108 having a reduced portion 110 and an enlarged portion 112 is mounted over spring 106 as shown in Figures 2 and 3. Enlarged portion 112 of boot 108 has substantially the same outside diameter as the inside diameter of screen or filter element 64. As best shown in Figure 2, boot 108 in its relaxed position assumes a position adjacent cup-shaped portion 104 of sleeve 102. However, when filter element 64 is extended longitudinally, its end abuts against an outwardly flared end 114 of boot 108 and the major portion of the boot telescopes within the filter element. Movement of the filter element to the fully extended position shown in Figure 3 will cause the boot to assume a position where it will seal any light from being transmitted through the frosted white portion 84 of filter element 64. Further, when the frosted red portion of filter element 64 surrounds lamp 12 to give a red floodlight, boot element 108 will have telescoped into the filter element far enough to have sealed the frosted white section of the filter element from leaking light rays therethrough, thus spoiling the full effect of the red floodlight.

As previously mentioned, lamp 12 is centered by means of post element 100 and cup-shaped sleeve 103 to maintain the filament of the lamp on the principal axis of the reflector. Since the reflector assembly 72 is provided with elongated tubular portion 70, thereby providing helical trackway 68 to move filter element 64 forwardly and rearwardly, any lateral movement of tubular portion 70 causes a distortion of reflector 74. Further, any distortion of tubular portion 70 jams the mechanism from moving filter element 64 forwardly and rearwardly. Therefore, an elongated sleeve 122 is frictionally fitted over tubular portion 70 of reflector assembly 72 to give rigidity to the tubular section and to prevent any distortion of reflector 74.

Referring now to Figures 11 and 12, a modified form of lens 116 for use with the lamp assembly of the present invention is disclosed. Lens 116 is provided with a plurality of convex surfaces 118 giving the lens a "pebbled effect." The pebbled side of the lens is placed nearest lamp 12, whereas smooth side 120 is placed away from the lens. By having a "pebbled lens," the light rays, when the lamp assembly is set on either red or white spotlight, are slightly diffused and any bright spots caused by the filament of lamp 12 are eliminated. In other words, since in light assemblies of this character the filament of the lamp is large with respect to the focal length of the reflector, the spotlight beam will have two or more bright spots therein. The pebbled effect of lens 118 eliminates these bright spots, thereby providing a better beam without adding noticeably to the spread of the spotlight beam.

Referring now to Figures 2, 5, 6 and 7, it will be noted that resistance coil 42 is curved and concentrically positioned with respect to the longitudinal axis of housing 10. Resistance coil 42 is carried in cup-shaped casing 40 and has its contact area facing rearwardly of the lamp assembly. As best shown in Figure 6, wiper arm 52 is mounted in cup-shaped knob 50 and is provided with a contact 124 which engages resistance coil 42 and a contact 125 which engages binding post 56. Rotation of knob 50 increases or decreases the current supplied to lamp 12 depending on the position of contact 124 with respect to a binding post 126 which connects coil 42 with the source of current. In other words, a conductor 128 from the source of power is connected directly to binding post 126, and current will travel through the binding post and through resistance coil 42 to the point where contact is made by wiper arm 52. The current then travels through the wiper arm to binding post 56 and to contact 54 which engages the contact on the base of lamp 12. Of course, lamp 12 is also grounded to the casing and a ground conductor 130 from the source of power is grounded to the casing or housing, as indicated at 132.

Mounted on rheostat casing 40 adjacent to resistance coil 42, but insulated therefrom, is a circular conductor or ring 134. Conductor ring 134 also connects to binding post 126 but has a minimum of resistance as compared to the resistance coil 42. Wiper 52 is provided with an extension 136, having a contact 138 thereon. Contact 138 is normally spaced from conductor ring 134. However, knob 50 is provided with an aperture 140 therein in which is placed a plunger 142. An enlarged end 144 of plunger 142 bears against the contact or switch 144 and is normally urged outwardly by the resiliency of extension 136. When it is desired to momentarily supply full intensity of current to lamp 12, plunger 142 is pressed inwardly and it causes contact or switch 138 to engage circular conductor 134, regardless of the position of wiper arm 52 on coil 42. In other words, instead of current flowing from binding post 126 through resistance coil 42 to the position of contact 124 of wiper arm 52 and then to the lamp, the current now flows through the binding post directly to the low resistance conductor ring and through the switch or contact 138 to binding post 56 and the lamp. When this occurs, the rheostat is completely shunted without the disadvantage of resetting the same when it is desired to permit the light to flash at its previously desired intensity.

Since resistance coil 42 encircles only a portion of the casing, as disclosed in Figure 5, rheostat casing 40 is provided with a lug 148 which rides in a groove 150 in knob 50. By provision of lug 148 riding in arcuate groove 150, the amount of rotation of knob 50 is limited between the off position of the rheostat where contact 124 is not engaging the end 152 of resistance coil 42 and the full intensity position when contact 124 is engaging binding post 126.

The terminology used in the specification is for the purpose of description and not of limitation, the scope of the invention being defined in the claims.

I claim:

1. In a light projecting structure of the type adapted for selectively concentrating and diffusing light rays, a tubular housing, a lens supported by said housing, a concave-shaped reflector in said housing behind said lens, a lamp supported centrally of said reflector and between said reflector and said lens, filter means having a portion for concentrating light rays from said lamp and another portion for diffusing light rays from said lamp, said filter means being selectively operable to filter light rays from said lamp to concentrate and diffuse the same, means positioned axially of and between said lens and said lamp for maintaining said lamp centered with respect to said reflector, and for shielding light rays from passing directly forward from said lamp through said lens, and means effective when said filter means is in a position for concentrating the light rays to provide a light seal of the portion of said filter means for diffusing the light rays.

2. A light projecting structure of a character described in claim 1 wherein said means for centering said lamp includes a member centrally connected to said lens and extending therefrom toward and engaging the end of said lamp.

3. A light projecting structure of the character described in claim 2 wherein the portion of said member engaging said lamp is cup-shaped to receive the end of said lamp, to center the same and shield light from passing directly forward therefrom through said lens.

4. A light projecting structure of the character described in claim 2 wherein said member includes a post element fixedly attached to the center of said lens and a sleeve element movable on said post element and resiliently urged away from said lens into engagement with said lamp, said sleeve element having its end which engages said lamp cup-shaped to thereby receive said lamp and center the same while shielding light rays from passing directly forward from the same through said lens.

5. In a light projecting structure of the type adapted to selectively concentrate and diffuse light rays, a tubular housing, a lens supported by said housing, a reflector member supported within said housing and behind said lens, a lamp supported centrally of said reflector member and between said reflector and said lens, a filter element, said filter element being tubular and positioned concentrically of said lamp and having at least a forward portion for diffusing light rays from said lamp and a rearward portion for concentrating light rays from said lamp, means for moving said filter element forwardly toward said lens and rearwardly away from said lens to thereby selectively concentrate and diffuse light rays, means positioned axially of and between said lens and said lamp for maintaining said lamp centered with respect to said filter element and said reflector, and means effective when said filter element is in its forward position for preventing leakage of light from said lamp through the forward portion of said tubular filter element.

6. A light projecting structure of the character described in claim 5 wherein said means for centering said lamp includes a cup-shaped member extending from said lens and engaging the end of said lamp.

7. A light projecting structure of the character described in claim 6 wherein said cup-shaped member is resiliently mounted on said lens and is spring urged away from said lens into engagement with said lamp.

8. A light projecting structure of the character described in claim 5 wherein said means for preventing leakage of light rays from said lamp through the forward portion of said filter member includes a cylindrical shaped boot member supported on said lamp centering means and adapted to telescope within said tubular filter element when said tubular filter element is in its forward position.

9. A light structure of the character described in claim 5 wherein said lens is smooth on one side and pebbled on the other side, thereby slightly diffusing light transmitter from said reflector to eliminate bright spots in the projected light rays.

10. A light structure of the character described in claim 5 wherein said lens is smooth on its side away from said lamp and is convexly pebbled on the side nearest said lamp.

References Cited in the file of this patent

UNITED STATES PATENTS

| | | |
|---|---|---|
| 1,675,431 | Sharp | July 3, 1928 |
| 2,165,531 | Bertrand | July 11, 1939 |
| 2,177,482 | Hall | Oct. 24, 1939 |
| 2,186,154 | Stoekle | Jan. 9, 1940 |
| 2,215,829 | Evans | Sept. 24, 1940 |
| 2,287,505 | Wood | June 23, 1942 |
| 2,337,746 | Garstang | Dec. 28, 1943 |
| 2,361,765 | Grimes | Oct. 31, 1944 |
| 2,677,045 | Mac Arthur | Apr. 27, 1954 |
| 2,696,552 | Meredith et al. | Dec. 7, 1954 |
| 2,707,780 | Heller et al. | May 3, 1955 |
| 2,784,304 | Dircksen et al. | Mar. 5, 1957 |

FOREIGN PATENTS

| | | |
|---|---|---|
| 665,640 | Germany | Sept. 30, 1938 |
| 674,471 | Germany | Apr. 14, 1939 |